March 9, 1937. R. W. OMAN 2,073,265
COFFEE MAKING APPARATUS
Original Filed Jan. 9, 1933
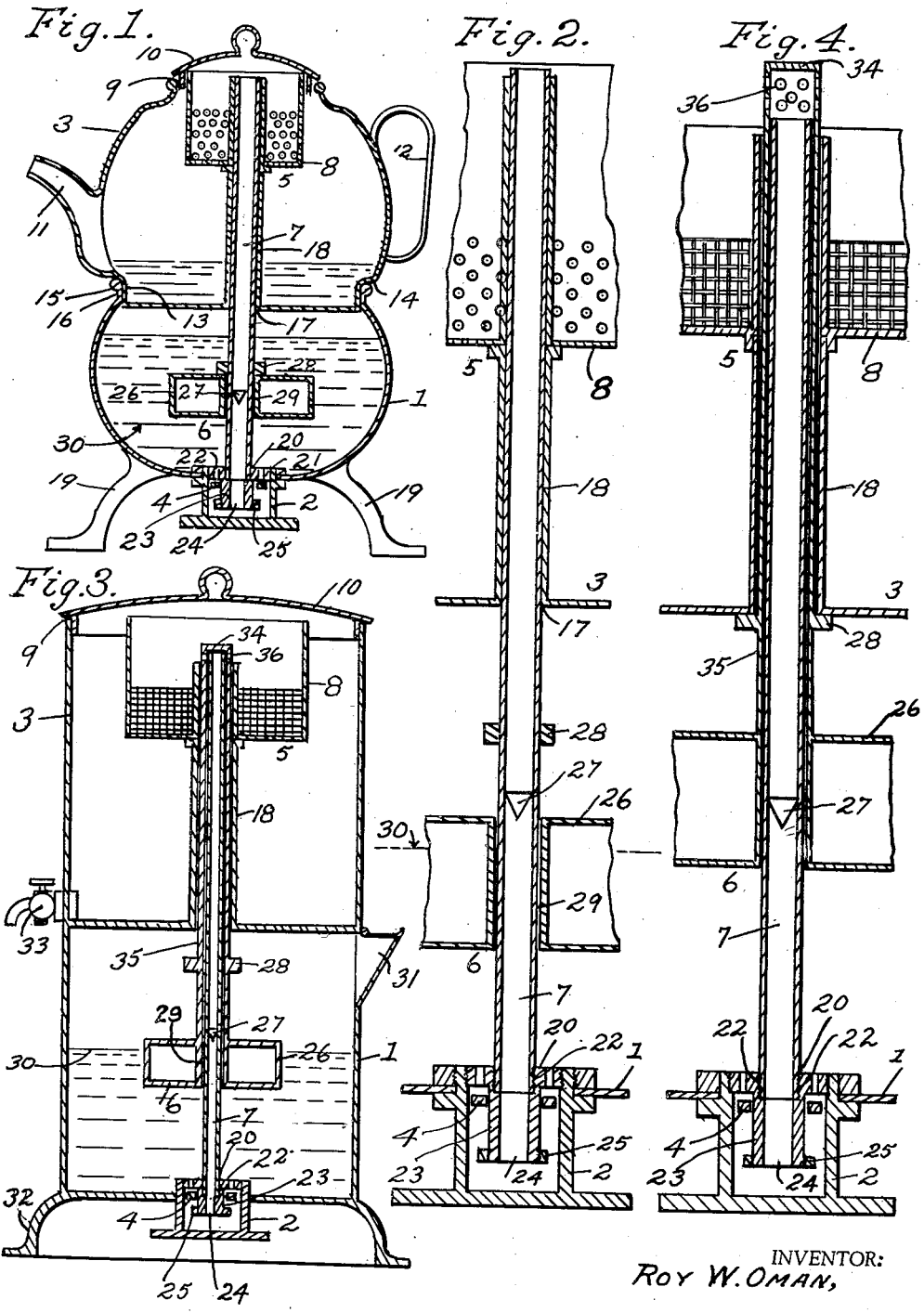
INVENTOR:
ROY W. OMAN,
BY Alan Franklin
ATTORNEY.

Patented Mar. 9, 1937

2,073,265

UNITED STATES PATENT OFFICE 2,073,265

COFFEE MAKING APPARATUS

Roy W. Oman, Los Angeles, Calif.

Application January 9, 1933, Serial No. 650,777
Renewed August 3, 1936

2 Claims. (Cl. 53—3)

This invention relates to coffee makers, and more particularly to a coffee making apparatus which will automatically control the supply of hot water to a coffee filtering chamber forming part of the apparatus.

The general object of the invention is to provide a coffee making apparatus which will automatically prevent further supply of boiling water to a coffee filter, forming part of the apparatus, when a predetermined amount of boiling water is supplied to said filter, thus preventing further filtering of the coffee and further boiling of the coffee liquor.

A particular object of the invention is to provide a coffee making apparatus which will automatically by-pass the supply of hot water to a water supply receptacle, when a predetermined amount of boiling water is supplied to a coffee filter forming part of the apparatus.

Another object of the invention is to provide a device of the character stated which is simple, and highly efficient in operation.

Other objects and advantages will appear hereinafter.

The invention is illustrated in the annexed drawing which forms a part of this specification and in which, Figure 1 is a vertical longitudinal section of a coffee making apparatus for household use embodying my invention.

Figure 2 is a fragmentary vertical longitudinal section on an enlarged scale of the apparatus shown in Figure 1, showing the float control valve lowered and uncovering the filter tube outlet for by-passing the boiling water into the water supply receptacle when a predetermined amount of boiling water is supplied to the coffee filter.

Figure 3 is vertical longitudinal section of a coffee making apparatus of the urn type embodying my invention, showing the float valve uncovering the by-pass outlet of the filter tube.

Figure 4 is a fragmentary vertical longitudinal section on an enlarged scale of the apparatus shown in Figure 3, showing the float control valve raised and closing the by-pass outlet in the filter tube.

Corresponding parts are designated by the same reference characters in the figures of the drawing.

Referring particularly to the drawing my invention comprises generally a water supply receptacle 1, a water boiling chamber 2, a coffee receptacle 3, a check valve 4 controlling the supply of water from said water receptacle to said heating chamber, a filter 5, and a float control valve 6 for automatically controlling the supply of boiling water from said water boiling chamber through a hot water filter supply tube 7 to the dry coffee placed in the filter chamber 8.

In Figures 1 and 2 of the drawing I have illustrated my invention embodied in an apparatus of the coffee pot type for household use, the coffee receptacle 3 being in the form of a coffee pot having an opening 9, in the top thereof, covered by a lid 10, including a spout 11 and a handle 12. The bottom portion 13 of the receptacle 3 is reduced and an external shoulder 14 is formed on the receptacle, above said reduced bottom portion, to rest upon a seat 15, formed on the upper edge of a neck 16, upstanding from the upper edge of the water receptacle 1 of bowl formation, with said reduced bottom portion 13 fitting within said neck 16, whereby the coffee receptacle 3 is detachably mounted in the water supply receptacle 1. The coffee receptacle 3 is provided with an opening 17 in the bottom wall thereof, and a tubular seat 18 extends upwardly from said bottom wall around said opening for supporting the filter chamber 8 in the upper part of the coffee receptacle within the opening 9 in the top thereof and for receiving the filter tube 7, which extends upwardly from the water boiling chamber 2 through said opening 17 in the bottom of the coffee receptacle and through said tubular seat into the upper part of said filter receptacle.

The water supply receptacle 1 is formed with legs 19 to rest upon a stove for supporting the receptacle on the stove with the water boiling chamber 2 resting over the stove burner (not shown) said boiling chamber being mounted in the bottom of said receptacle and depending therefrom.

The water boiling chamber 2 is closed at its upper and inner end by a plug 20 screw seated therein, as indicated at 21, said plug being provided with inlets 22 leading from the water supply receptacle 1 into the boiling chamber 2. The plug 20 is formed with a depending stud 23 extending downwardly in the boiling chamber 2, and the outlet 24 of said chamber extends through said stud and the plug 20 in communication with the lower end of the filter tube 7 which is screw-seated in said plug.

The check valve 4 is in the form of a flat collar which is slidably fitted on the stud 23 to descend and uncover the inlets 22 to admit water from receptacle 1 into the boiling chamber 2, and to be raised by the pressure of the boiling water in said chamber to close said inlets to shut off the supply of water from said receptacle into said chamber so that the pressure will force the boiling water from said chamber up through the filter tube 7 into the filter chamber 8. A nut 25 is screw-seated on the lower end of the stud 23 for arresting the descent of the check valve 4 and adjusting the movement of said valve for its most efficient operation.

The float valve 6 comprises a float 26, a by-pass outlet 27 in the filter tube 7 of an area corresponding to the area of the upper discharge end of said tube, and a stop 28 on said tube for limiting the rising movement of the float in position closing said outlet. The float valve 6 is located within the water supply receptacle 1. The float 26 is formed with an opening 29 extending therethrough to receive the filter tube 7 whereby the float is slidably mounted on said tube. The outlet 27 is preferably triangular shape with one side thereof uppermost and extending cross-wise of the tube 7 so that when the water level and float descend it will first uncover the largest area of the outlet, thus enabling the float to uncover the outlet for effective operation in by-passing the boiling water in said tube into the receptacle 1 above the water level therein.

The operation, uses and advantages of my invention are as follows:—

Water of a predetermined amount is placed in the receptacle 1 to a level which causes the float 26 to rise and close the by-pass outlet 27 in the filter tube 7. (See Figs. 1 and 4.) Dry coffee of a suitable amount is placed in the filter chamber 8. The check valve 4 resting upon the nut 25 and uncovering the inlets 22, water passes from the receptacle 1 through said inlets into the boiling chamber 2. The apparatus is placed on a stove with the water boiling chamber 2 over the stove burner. As the water boils in the chamber 2 its pressure forces the check valve 4 up against the plug 20 and closes the inlets 22, preventing the escape of the boiling water from said chamber through said inlets into the receptacle 1, and causing the boiling water to be forced up through the filter tube 7 out through the upper end thereof and into the filter chamber 8, where it filters through the dry coffee in said filter chamber and through the perforations of said chamber into the coffee receptacle 3. As the boiling water passes out of the boiling chamber 2 up the filter tube 7, the reduced pressure in said chamber allows the check valve 4 to descend and uncover the inlets 22, whereupon additional water passes from the supply receptacle 1, through the inlets 22, into the chamber 2, until said chamber is again filled with water and said inlets again closed by the check valve 4 under pressure of the boiling water in said chamber. Additional boiling water is then forced up the filter tube 7 and filtered through the dry coffee in the filter chamber 8 and through said chamber into the coffee receptacle 3, and the above described operations are repeated until coffee of the desired consistency and flavor is made in said coffee receptacle, at which time the water in the supply receptacle 1 and the float 26 have sunk to a level where said float uncovers the by-pass outlet 27 in the filter tube 7, whereupon the boiling water in said tube is by-passed therefrom through said outlet into the supply receptacle 1 above the level of the water therein, and additional boiling water is thus prevented from passing up through said tube, out of the upper end thereof and through the filter chamber 8 into the coffee receptacle 3 and reboiling the coffee liquor in said receptacle. The apparatus may then remain on the stove indefinitely without further boiling of the coffee liquor in the receptacle, the only effect being to keep the coffee warm.

When the water level and the float 26 have sunk to a point where said float uncovers the bypass outlet 27, a certain amount of water, up to the level indicated 30, is left in the supply receptacle 1, which remains in the receptacle, until additional water is placed therein to make more coffee, and prevents the heat of the stove burner from burning up said receptacle while the apparatus remains on the stove.

The coffee receptacle 3 may be raised off the water supply receptacle 1 and used as a conventional household coffee pot, the filter tube 7 withdrawing from the filter chamber 8 and its tubular seat 18, and said filter chamber remaining in the coffee receptacle 3.

In Figures 3 and 4 of the drawing my invention is illustrated as embodied in a coffee maker of the urn type which includes the primary elements of the embodiment of my invention shown in Figures 1 and 2, such as the water supply receptacle 1, boiling chamber 2, coffee receptacle 3, check valve 4, filter 5, float valve 6, filter tube 7, opening 9 in the top of the coffee receptacle, lid 10 for said opening and tubular seat 18 upon which the filter chamber 8 is detachably mounted. The water supply receptacle has a water inlet 31, for introducing water into the same, and a base 32 for supporting the apparatus on a stove with the boiling chamber 2 over the stove burner. A faucet 33 is connected to the lower part of the coffee receptacle 3 for drawing off the coffee from said receptacle. An auxiliary valve 34 may be provided for closing the upper end of the filter supply tube 7 when the coffee is made in the coffee receptacle 3 and the float 26 has uncovered the by-pass outlet 27, whereby steam from the boiling water from the tube 7 to the filter chamber 8 is positively shut off. Said auxiliary valve 34 may be formed on the upper end of an auxiliary tube 35, upstanding from the float 26 around the tube 7 through an enlarged tubular seat 18 and the filter chamber 8, and provided with perforations 36 near its upper end to permit the escape of boiling water from the upper end of the filter tube 7, when the float 26 is raised and covers the by-pass outlet 27 for causing the boiling water to pass through said tube to the filter chamber 8 for making coffee as aforesaid. The stop 28 is formed on the tube 35 and engages the under side of the coffee receptacle 3 to limit the rising of the float 26 in position covering the outlet 27.

With my invention it is possible to make a definite amount of coffee of a definite consistency and flavor by placing a definite amount of dry coffee in the filter chamber 8 and placing a definite amount of water, for example, four cupfuls, in the water supply receptacle 1, when the float 26 is in position uncovering the by-pass outlet 27 and the water level in said receptacle corresponds to the level 30.

In this specification and the annexed drawing I disclose my invention in forms which I consider desirable, but I do not limit my invention to such forms, because it may be embodied in other forms, and it is to be understood that in and by the claims of this specification, I intend to cover my invention in whatever form it may be embodied.

I claim as my invention:—

1. In an apparatus as disclosed, a water-supply receptacle, a coffee receptacle, a coffee filter chamber, a water-boiling chamber, a plug closing the upper end of said water-boiling chamber provided with inlets for admitting water from said water-supply receptacle into said water-boiling chamber, said plug being formed with a depending stud and a bore extending through said stud, a collar valve slidably fitted on said stud below said inlets for controlling the supply of water from said water-supply receptacle through said inlets, a nut on the lower end of said stud for retaining said valve on said stud, and a filter tube connected at its lower end to said plug in said bore and extending upwardly into said coffee filter chamber.

2. Apparatus as disclosed in claim 1 including means for automatically preventing a further supply of boiling water from said water-boiling chamber through said filter tube into said filter chamber when a predetermined amount of boiling water is supplied to said filter chamber.

ROY W. OMAN.